United States Patent [19]

Wermeister et al.

[11] Patent Number: 4,488,839
[45] Date of Patent: Dec. 18, 1984

[54] INTERNAL DISK MILLING CUTTER

[75] Inventors: Günter Wermeister, Ratingen; Josef Noy, Kerken, both of Fed. Rep. of Germany

[73] Assignee: Santrade Ltd., Luzern, Switzerland

[21] Appl. No.: 372,714

[22] Filed: Apr. 28, 1982

[30] Foreign Application Priority Data

May 23, 1981 [DE] Fed. Rep. of Germany ....... 3120588
Jul. 7, 1981 [DE] Fed. Rep. of Germany ....... 3126710

[51] Int. Cl.³ .............................................. B23C 5/22
[52] U.S. Cl. ...................................... 407/43; 407/46; 407/51
[58] Field of Search .............. 407/51, 52, 35, 46, 407/47, 49, 43

[56] References Cited

U.S. PATENT DOCUMENTS

| Re. 13,458 | 8/1912 | Gorton et al. | 407/43 |
|---|---|---|---|
| 1,028,710 | 6/1912 | Gorton | 407/43 |
| 1,028,846 | 6/1912 | Gorton et al. | 407/43 |
| 1,077,271 | 11/1913 | Gorton | 407/52 |
| 1,078,193 | 11/1913 | Gorton | 407/43 |
| 2,688,792 | 9/1954 | Sunnen | 407/43 |
| 3,566,506 | 3/1971 | Wolf | 407/47 |
| 4,097,174 | 6/1978 | Heinlein | 407/46 |

FOREIGN PATENT DOCUMENTS

| 722702 | 3/1980 | U.S.S.R. | 407/43 |
|---|---|---|---|
| 761163 | 9/1980 | U.S.S.R. | 407/43 |
| 770682 | 10/1980 | U.S.S.R. | 407/43 |

Primary Examiner—Leonidas Vlachos
Assistant Examiner—Jerry Kearns
Attorney, Agent, or Firm—Burns, Doane, Swecker & Mathis

[57] ABSTRACT

An internal disk milling cutter for the milling of workpieces includes a one-piece annular base body. Insertable tool bit holders are arranged around a circumferentially internal surface of the annular base. Most of the holders are in the shape of circular segments and have frontal surfaces engaging the frontal surfaces of the adjacent holders. One holder has frontal surfaces which are non-diverging in the radially outward direction. An adjacent holder has a frontal surface of the one holder. A clamp wedge is disposed in either of such opposing frontal surfaces to clamp all of the holders circumferentially together. The holders bear radially outwardly against the base at circumferentially spaced locations which are in the vicinity of the frontal surfaces.

5 Claims, 7 Drawing Figures

INTERNAL DISK MILLING CUTTER

BACKGROUND AND OBJECTS OF THE INVENTION

The invention concerns an internal disk milling cutter for the external cylindrical milling of workpieces such as axles, crankshafts and the like.

French Pat. No. 734,552 describes an internal disk milling cutter for the milling of axles, crankshafts and the like, comprising a two-part external housing ring, on the inner sides of which the cutting tools are seated in the manner of riders, thereby being held in the radial and the axial directions, with the frontal surfaces of adjacent cutting tools abutting against each other. Austrian Pat. No. 194,219 describes an external disk milling cutter wherein most of the holders carrying the cutting bits are abutting against each other with their frontal surfaces.

An internal disk milling cutter is also known from DE-AS No. 25 15 937. Its object is to prevent the formation of internal stresses in the tool as the result of the generation of heat during the machining operation. Such internal stresses may effect the quality of the operation. For this purpose, a radial gap is left between the individual tool bit holders or segments, with each holder or segment being joined to the base by two threaded bolts. The replacement of the holders or segments requires the release of twice the number of bolts, which themselves are prestressed in bending during installation.

It is the object of the invention, in view of these known forms of internal disk milling cutters, to obtain a high positional accuracy of the tool bit holders, without the need for separate fastening means for each holder.

Another object is to avoid the stressing in shear or bending of clamping bolts when such are used as fastening means.

A further object is to enable the use of clamping bolts to be eliminated for most of the holders.

A further object is to avoid the need for a high machining accuracy for the contact surfaces of the holders and the base or for the maintenance of such an accuracy during the period of use of the cutter.

The means to be used to attain these objects should be simple in design and readily handled.

SUMMARY OF THE INVENTION

The objects of the invention are attained by an internal disk milling cutter according to the present invention. The cutter includes a one-piece annular base having an internal circumferential edge and a series of radially inwardly extending holders arranged around the internal edge. The holders carry tool bits, each including a first abutment bearing radially outwardly against a second abutment of the base to support the holders in a radial direction. The holders each include a third abutment bearing axially against a fourth abutment of the base to support the holders in an axial direction. A selected plurality of the holders are of generally circular-segment configuration and each include frontal surfaces which engage associated frontal surfaces of adjoining holders to prevent radially inward movement of the plurality of holders. The frontal surfaces of one of the holders are of non-diverging relationship in the radially outward direction. At least a first of the holders adjoining said one holder has a frontal surface which is generally parallel to the opposing frontal surface of said one holder. A clamping wedge is disposed in either of the opposing frontal surfaces of said one holder and said first holder and is arranged to act in a circumferential direction against the other such opposing surface, to push all of the holders together in the circumferential direction.

One of the advantages of the internal disk milling cutter according to the invention is that the holders bearing the cutting tool bits may be clamped against each other by means of a single element in the form of the clamping wedge, whereby the radial fastening of each holder by means of a radial clamp bolt may be eliminated. As all of the holders are urged frictionally against their neighbors, the cutting force applied to the holders acting on the workpiece is distributed with extensive uniformity over the radial clamping bolts.

A further advantage of the invention consists of the fact that each holder has, in the vicinity or at the height of the front and rear holder surface, a linear contact with the internal support surface of the annular base, i.e., the holder is supported on two lines by the internal surface of the annular base and thereby assures an accurate positioning of the holders with respect to the base. This two-line positioning of the holder feet on the internal support surface of the base may be attained readily without special requirements concerning the accuracy of the bottom surface of the holder, with the surface machining of both the internal support surface of the base and of the bottom surface of the tool bit holders being of secondary importance.

THE DRAWING

Examples of preferred embodiments of a disk milling cutter according to the invention are shown in the drawing, wherein.

DETAILED DESCRIPTION OF PREFERRED EMBODIMENTS OF THE INVENTION

Figure 2:
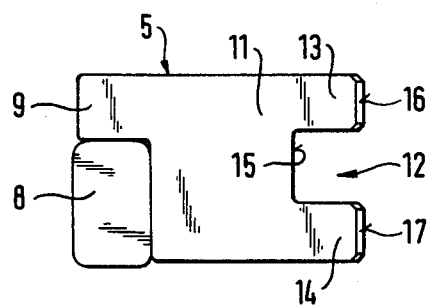
FIG. 2 is a front view of one of the tool bit holders of the disk milling cutter according to the invention.

The base 1 of the disk milling cutter according to the invention has a wheel-shaped configuration and thus a circular external circumference (only partially shown). The internal circumference of a base 1 of the cutter has an internal circumferential edge which comprises a median rib 2, forming on both sides an abutment shoulder 3 in the shape of a circular arc and possessing an annular top side or abutment 4. The base thus has the configuration of a one-piece, closed annular body, on the internal sides of which are arranged a plurality of holders 5 and a holder 6 and a holder 7. The holders, which are uniform in their shape with the exception of the adjoining holders 6, 7, to be explained hereinbelow, carry tool bits 8, illustrated schematically. The latter are arranged in groups in all of the holders in the area of a head 9 of the holder and in front of chip grooves 10. A bottom section 11 of each holder (FIG. 2) is U-shaped with two projections 13, 14 on either sides of a recess 12. A surface 15 interconnects the projections 13, 14. When the holders 5 are mounted on the base, the radially outwardly facing surface 15 abuts against the top side 4 of the rib 2, or the two radially outwardly facing end surfaces 16, 17 of the projections 13, 14 abut the shoulder 3. The surfaces 16, 17 are preferably configured in a manner to be described hereinafter. The width of the groove 12 corresponds to the width of the rib 2, so that the holders are supported in the axial direction of the milling cutter on the base 1, in the manner of riders. The holders each have the general shape of a segment of a circle as viewed parallel to the axis C.

Figure 4:
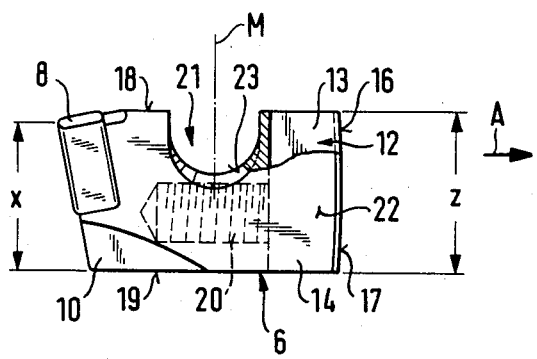
FIG. 4 shows a holder with parallel frontal surfaces.

The holders 5, of uniform configuration, form together with the two holders 6 and 7 an uninterrupted row of holders with tool bits. One of the holders 6 possesses two parallel frontal surfaces 18, 19 and internal threads 20, into which a clamping bolt 31, to be described in detail hereinbelow, is screwed with its radially inner end. An alternative configuration of the holder 6 is depicted in FIG. 4 which corresponds to that of FIG. 1, except for the shape of the groove 10 and the tool bit 8. Since the frontal surfaces of the holder 6 are of non-diverging relationship in a radially outward direction, the holder 6 can be inserted radially into the series of holders 5, 7. The frontal surface 18 adjacent to or opposite to the frontal surface 28 of the holder 7 has an inwardly directed recess 21 (FIG. 4) approximately in the center of the height of the holder. The axis of symmetry M of the recess 21 extends perpendicularly to the frontal surfaces 18, 19. The recess 21 has two semi-cylindrical, oblique walls 23 (only one being visible in FIG. 4) inclined with respect to the two lateral side walls 22 of the holder. The walls 23 converge toward each other in the manner of a roof and meet in the center of the holder to form a curved edge 23A. The edge 23A is contained in an imaginary plane extending perpendicular to the axis C. A clamping wedge 26 (FIG. 1) is provided which includes a pair of aligned, semi-cylindrical half-sections 25 (only one of which being visible in FIG. 1). A curved wall 24 of each of the wedge sections 26 abuts one of the oblique walls 23, with external, straight surfaces 27 of the clamping wedge sections abutting the adjacent frontal surface 28 of an adjoining holder 7. The two halves of the clamping wedge are equipped with threaded bores and may be clamped against each other by means of a threaded bolt 25a having two opposite threads and, in the process, are sliding along the oblique walls 23, such that the surfaces 27 emerge to a greater or lesser extent from said recess 23.

The holder 7 has a configuration such that it fills, together with the holder 6, the space between the two last holders 5a, 5b of the annular row of holders 5, when the adjacent frontal surfaces of the holders are abutting against each other, and the straight surfaces 27 of the halves 25 of the clamping wedge 26 are abutting against the frontal surfaces 28. To effect a proper abutment of the surfaces 27, the wedge 26 may rotate in the recess 21 around its axis.

Radial clamping of the holders 5 may be accomplished by means of radial clamping bolts 30. However, such radial clamping of the individual holders 5 may be eliminated or possibly only every third or fourth holder 5 may be clamped by means of a radial clamping bolt 30 (FIG. 1) against the base 1. A similar clamping bolt 31 enters the holder 6, the bolt 31 being received in a radial bore 32 of the base 1. The diameter or width of the bore 32 is larger in the circumferential direction of the base 1 than the diameter of the clamping bolt 31, so that the latter may adjust itself within the bore 32 following the clamping of the holders of the row of holders against each other by means of the clamping wedge 26. The bores 33 may have a similar arrangement with respect to the bolts 30.

In a deviation from the form of embodiment of the holder 6 in FIG. 4, the latter may have non-parallel frontal surfaces 18, 19 converging toward the base 1, i.e., in the direction A of FIG. 4, so that in this case the holder 6 may again be radially inserted, following the insertion of all of the holders 5 and of the holder 7, between the latter and the last holder 5 whereupon the clamping of this holder and the holders of the entire ring of holders against each other, may be effected, after which the initially slightly loose clamping bolts 30, 31 may be tightened. That is, the frontal surfaces of the holder 6 should be non-diverging in the radial outward direction; they may diverge in that direction or simply be parallel.

The frontal surfaces 44, 45 of the holders 5 diverge toward the base 1. Thus, by inserting the holders 5 and then installing the holders 6, 7, the holders 5 are secured against radial movement by the engagement of the adjoining frontal surfaces 44, 45. It is readily seen, then, that in order to release all of the holders from the base, it is only necessary to relieve the clamping effect applied by the clamping wedge 26 to the holders (and possibly to release the clamping bolts 30, 31 if employed) and to extract the holder 6 from its position, whereupon all of the holders may be taken rapidly from the base.

The clamping wedge 26 may be arranged in the holder 7. If the clamping wedge is arranged in one of the holders 5, however, then in place of the three different types of holders, i.e., the holders 5, 6 and 7, four different types of holders may be used.

Figure 3:
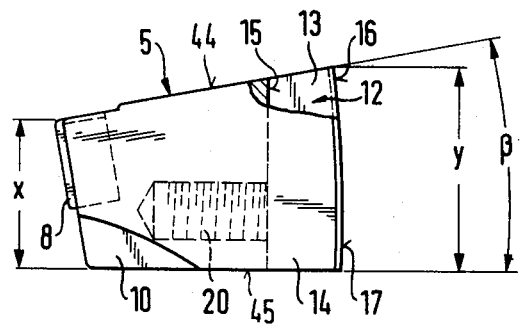
FIG. 3 shows one of a plurality of the tool bit holders used in the milling cutter.
Figure 5:
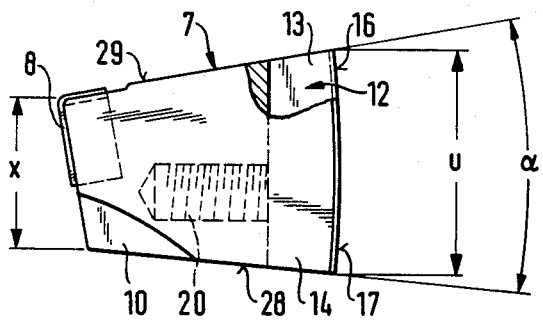
FIG. 5 shows the holder adjacent to the holder of FIG. 4.

As seen from a comparison of the holders 5, 6 and 7 in FIGS. 3 to 5 of the drawing, the head part of the holders facing the center axis C of the base 1 are all of a length x in the internal circumferential direction. However, the holders 5 have a length y, the holder 6 a length z, and the holder 7 a length u in the external circumferential direction. As the holder 6 has parallel frontal surfaces 18, 19 (or frontal surfaces converging outwardly), the angle $\alpha$ between the frontal surfaces 28, 29 of the holder 7 (FIG. 5) is correspondingly larger than the angle $\beta$ between the frontal surfaces 30, 31 (FIG. 3) of the holders 5, so that the holders 5, 6 and 7 form a closed annulus.

Figure 6:
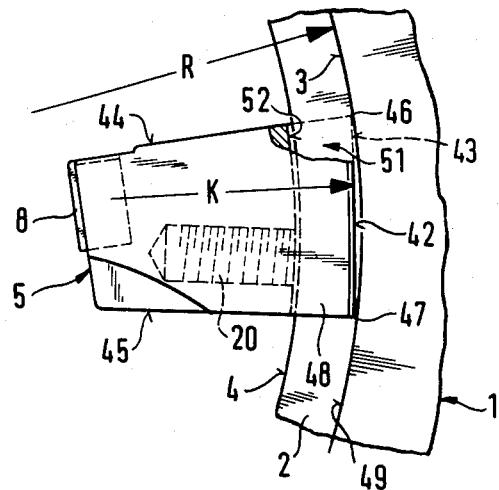
FIG. 6 shows one configuration of the feet of the holder facing the base.

In a further embodiment of the invention according to FIG. 6, the radially outwardly facing bottom surface 42, 43 of the projections 13, 14 of each holder 5, 6 and 7 is preferably convex, with the curving radius K of the bottom surfaces 42, 43 being larger than the curving radius R of the two bilateral shoulders 3 forming an internal support surface of the base 1 (only the holder 5 is shown). This results in the two frontal surfaces 44, 45 of each holder effecting an axial, linear abutment at circumferentially spaced locations 46, 47 of the holder bottom 48 with the internal support surface of the base 1 formed by the circular shoulders 3 on either side of the center rib 2 of the holder ring. As the contact of the holder bottom always extends over the width of the shoulders 3, at radially outward ends of the frontal surfaces 44, 45, short axial linear supports are obtained at 46 and 47, with the support lines extending coaxially or parallel with respect to each other. This makes possible an exact alignment of the holders 5, 6 and 7, without requiring precision machining of the bottom surfaces 42, 43 or of the support surface 49 of the shoulder 3, even when with aid of the clamping wedge 26 according to FIG. 1, a clamping pressure is applied in the circumferential direction of the holders. The limiting surface 52 is located at a distance from the top side of the rib 2.

The adjacent holders 5, 6 and 7 may form between their frontal surfaces 44, 45 a small, wedge-shaped gap 50 narrowing toward the center axis C of the disk milling cutter (FIG. 6 and 7), with the frontal surfaces of the adjoining holders abutting against each other in their upper head areas 55. This results, in addition to an exact positioning of the holders against the base 1, further an accurate positioning of the holders against each other in the circumferential direction, when the clamping wedge 26 is secured. The bottom surface 42, is shorter in the circumferential direction than the length of the arc over the central angle δ. (FIG. 6).

Figure 1:
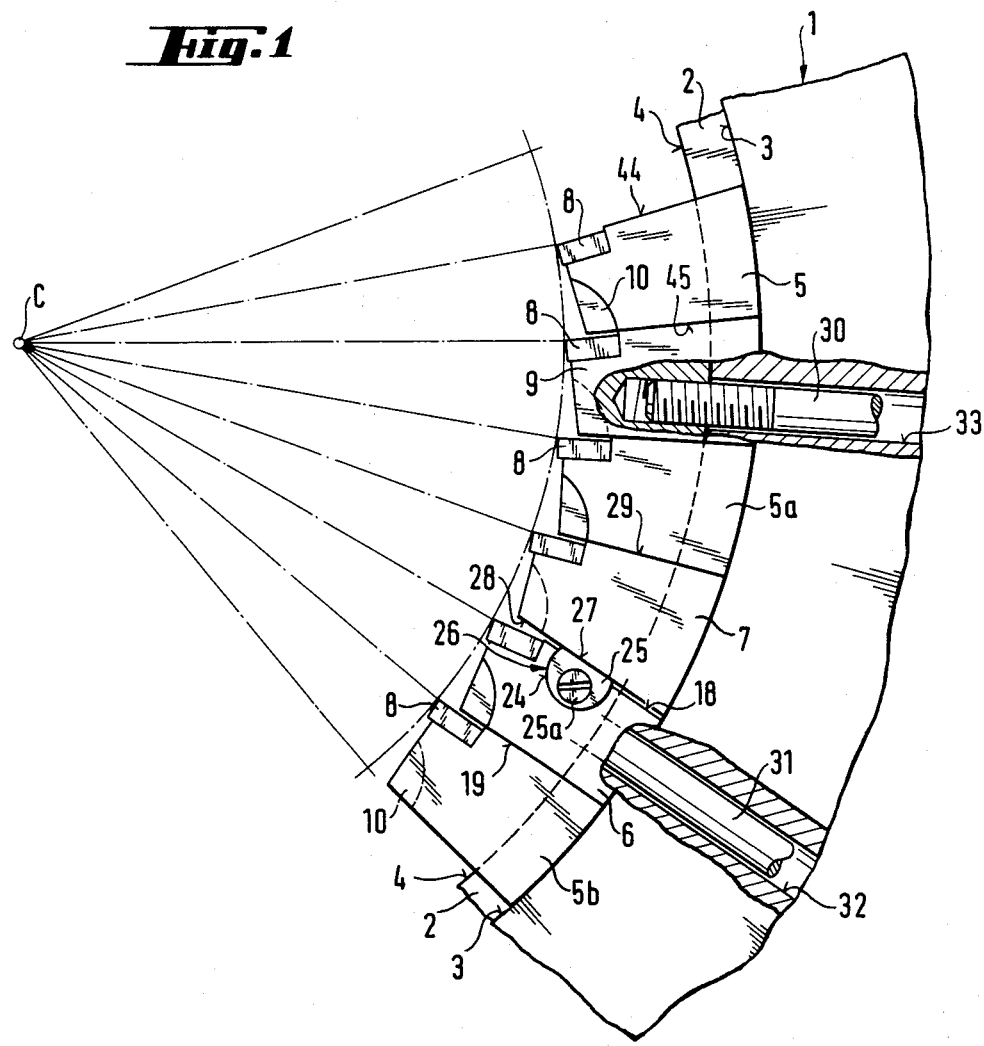
FIG. 1 is a partial top view of the milling cutter with portions broken away.
Figure 7:
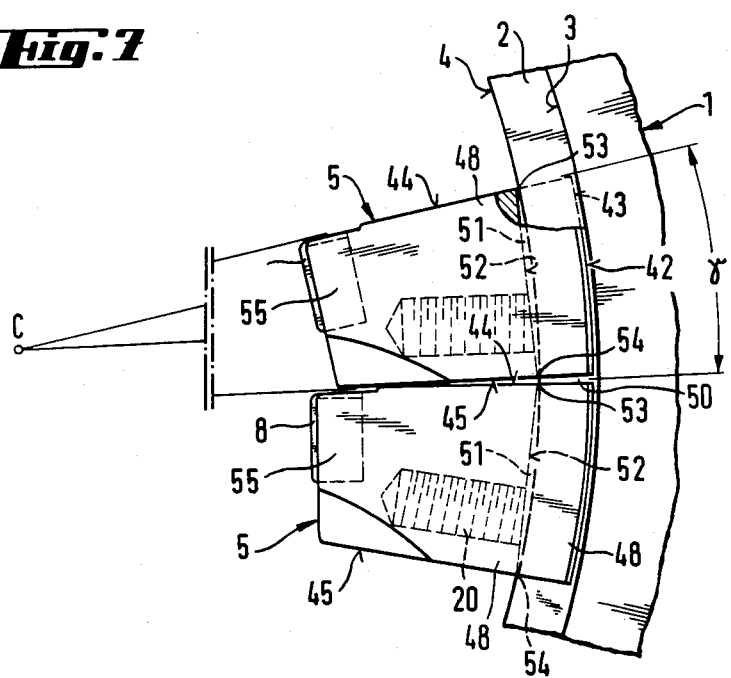
FIG. 7 shows another configuration of the feet of the holder.

In a further embodiment according to FIG. 7, it is possible to use the surface 52 bordering the radially inward end of the recess 51 as a support surface bearing against the top side 4 of the rib 2 of the base 1, wherein the axial securing of the holders 5, 6 and 7 is again assured by the lateral projections corresponding to the projections 13, 14 in FIG. 1, without the latter resting on the shoulders 3. In this embodiment, the radially outward facing abutment surface 52 of the bottom section 48 of the holders 5, 6, 7 facing the base 1 is straight and designed so that, as shown in FIG. 7, the holder is provided in the vicinity of the frontal surface 44, 45 with circumferentially spaced linear, axial supports 53 and 54 on the top side 4 of the rib 2.

Although the present invention has been described in connection with preferred embodiments thereof, it will be appreciated by those skilled in the art that additions, modifications, substitutions, and deletions may be made, without departing from the spirit and scope of the invention as defined in the appended claims.

What is claimed is:

1. An internal disk milling cutter for the external cylindrical milling of workpieces, said cutter including a one-piece annular base having an internal circumferential edge and a series of radially inwardly extending holders removably arranged 360 degrees around said internal edge in a circumferentially uninterrupted manner so as to be capable of exerting circumferential forces against one another, said holders carrying tool bits and each including first abutment means and said base including second abutment means against which said first abutment means bears in a radial direction to support said holders in such radial direction, said holders each including third abutment means and said base including fourth abutment means against which said third abutment means bears in an axial direction to support said holders in such axial direction, a selected plurality of said removable holders of said series being of generally circular-segment configuration and including radially outwardly diverging frontal surfaces arranged to exert circumferential forces against associated frontal surfaces of circumferentially adjoining removable holders to prevent radially inwardly movement of said plurality of holders, the frontal surfaces of one other of said holders being of non-diverging relationship in the radially outward direction, at least a first of said plurality of holders which adjoins said one other holder having a frontal surface which is generally parallel to the opposing frontal surface of said one other holder, a clamping wedge disposed in either of said opposing frontal surfaces of said one other holder and said first holder and arranged to act in a circumferential direction against the other said opposing surface, to push all of said holders of said series together in the circumferential direction, and a plurality of retaining means associated with same but not all of said holders of said series for releasably securing same to said base.

2. Internal disk milling cutter according to claim 1, wherein said clamping wedge is arranged intermediate the radial extent of its associated frontal surface.

3. Internal disk milling cutter according to claim 2, wherein said clamping wedge protrudes circumferentially outwardly from its associated frontal surface.

4. Internal disk milling cutter according to claim 1, wherein said frontal surface in which said clamping wedge is mounted has semi-circular recesses which intersect along a curved edge which is contained in a plane extending generally perpendicular to the axis of the base, said clamping wedge comprising two parts disposed in said recesses and arranged to exert circumferential clamping forces when displaced within said recesses.

5. Internal disk milling cutter according to claim 1, wherein said retaining means each include a generally radially extending bolt disposed in a generally radially extending passage arranged in said base in alignment with the associated holder, said bolt and associated holder having cooperating coupling means such that said bolt draws said associated holder radially outwardly against said internal circumferential edge of said base, said passage being of larger cross-section than said bolt to enable the latter to self-align relative to said associated holder.

* * * * *